(12) United States Patent
Myong et al.

(10) Patent No.: US 7,769,303 B2
(45) Date of Patent: Aug. 3, 2010

(54) APPARATUS AND METHOD FOR GENERATING RETURN-TO-ZERO SIGNAL

(75) Inventors: Seung Il Myong, Daejeon (KR); Hyung Joo Kim, Daejeon (KR); Jong Hyun Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 908 days.

(21) Appl. No.: 11/635,712

(22) Filed: Dec. 7, 2006

(65) Prior Publication Data

US 2007/0134005 A1  Jun. 14, 2007

(30) Foreign Application Priority Data

Dec. 8, 2005  (KR) .................. 10-2005-0120106
Jul. 28, 2006  (KR) .................. 10-2006-0071652

(51) Int. Cl.
*H04B 10/04* (2006.01)
(52) U.S. Cl. ...................... 398/192; 398/182
(58) Field of Classification Search ............... 398/182, 398/183, 186, 191, 192, 193, 201
See application file for complete search history.

(56) References Cited

U.S. PATENT DOCUMENTS 5,703,708 A * 12/1997 Das et al. ............. 398/102
6,771,910 B1 * 8/2004 Napier et al. ............. 398/185
6,876,818 B1 * 4/2005 Bai et al. ............. 398/154
7,085,498 B2 * 8/2006 Lee et al. ............. 398/155
2005/0117862 A1   6/2005 Carbone et al.
2005/0128556 A1   6/2005 Jang et al.

FOREIGN PATENT DOCUMENTS

| JP | 08-023310 | 1/1996 |
|---|---|---|
| KR | 1020010025149 | 4/2001 |
| KR | 1020040046381 | 6/2004 |
| KR | 1020040050416 A | 6/2004 |
| KR | 1020060034900 | 4/2006 |

* cited by examiner

Primary Examiner—Quan-Zhen Wang
(74) Attorney, Agent, or Firm—Blakely, Sokoloff, Taylor & Zafman

(57) ABSTRACT

Provided are an apparatus and a method for generating a return-to-zero (RZ) signal, including: a first modulator receiving a first signal having a predetermined frequency to modulate, compensate for and output a first laser beam; a second modulator receiving a second signal complementary to the first signal to modulate, compensate for, and output a second laser beam; a mixer mixing signals output from the first and second modulators to output a third signal; and a third modulator modulating the third signal into an RZ signal and outputting the RZ signal.

11 Claims, 5 Drawing Sheets

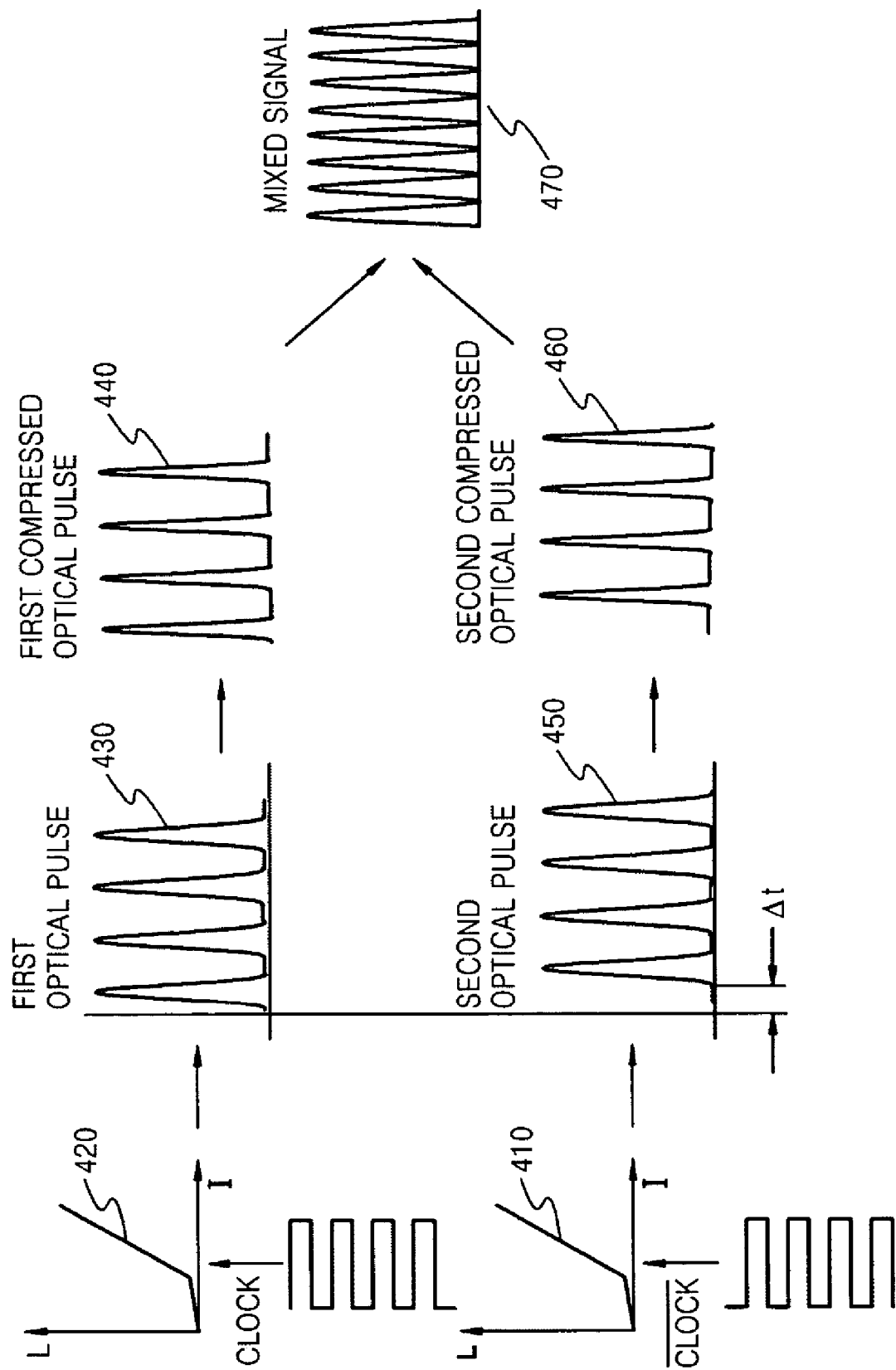

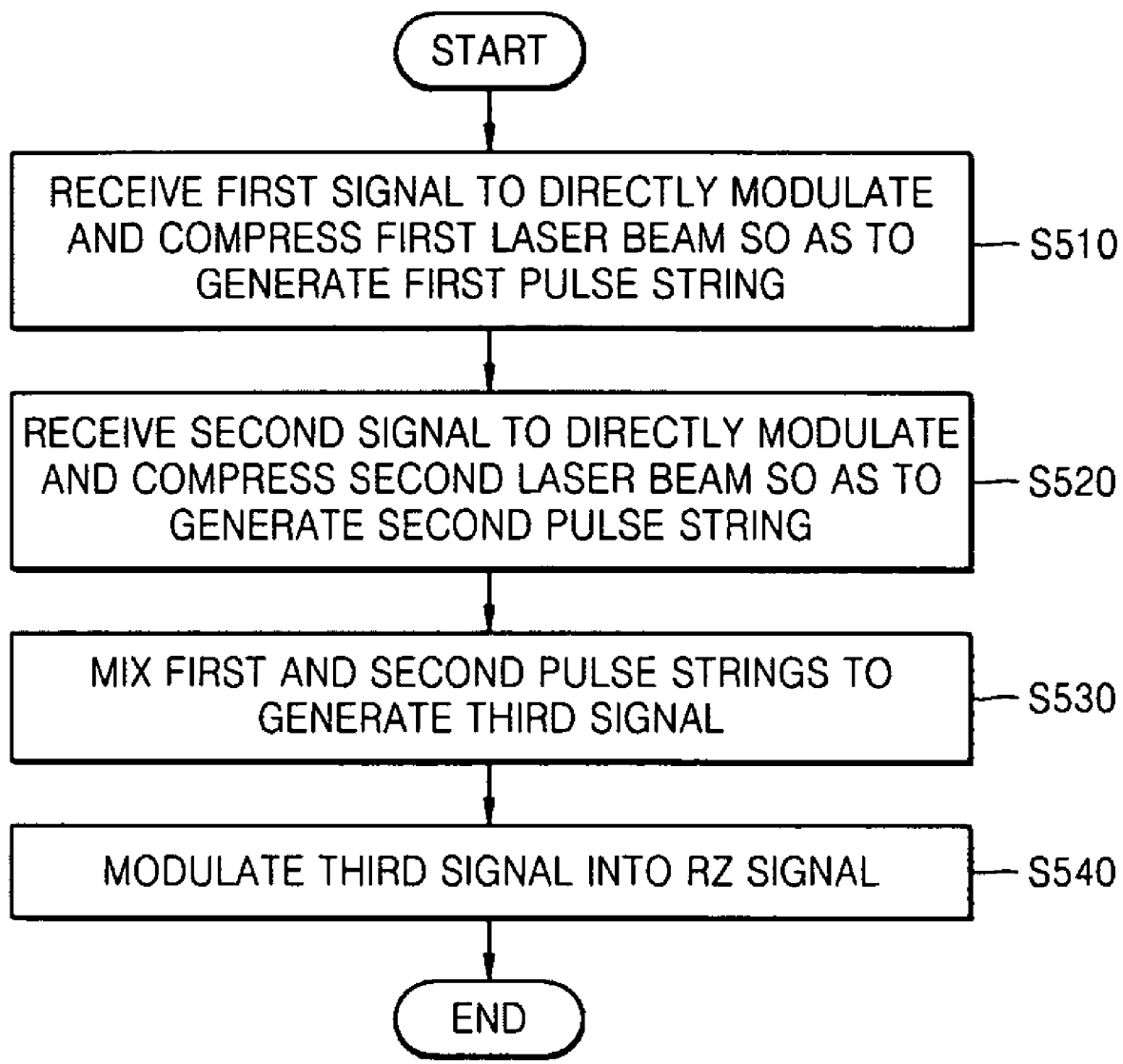

APPARATUS AND METHOD FOR GENERATING RETURN-TO-ZERO SIGNAL

CROSS-REFERENCE TO RELATED PATENT APPLICATION

This application claims the benefit of Korean Patent Application No. 10-2005-0120106, filed on Dec. 8, 2005 and Korean Patent Application No. 10-2006-0071652, filed on Jul. 28, 2006, in the Korean Intellectual Property Office, the disclosures of which are incorporated herein in their entirety by reference.

BACKGROUND OF THE INVENTION

1. Field of the Invention

The present invention relates to an apparatus and a method for generating a return-to-zero (RZ) signal, and more particularly, to an apparatus and a method for generating an RZ signal at low cost using two optical lasers without using two optical modulators in an optical transmitter.

2. Description of the Related Art

In general, a laser is directly modulated to generate a return-to-zero (RZ) signal of 2.5 Gbps or less. A stable RZ signal of 10 Gbps cannot be obtained through a direct modulation of a laser. Therefore, two external optical modulators are generally used. In the case of such an RZ modulation, a first optical modulator generates a pulse string, and a second optical modulator modulates data to obtain an RZ signal. Thus, the use of the two optical modulators incurs large costs. Moreover, a low cost method is required to be used in an optical network or the like.

FIG. 1 is a diagram illustrating a method of generating an RZ signal using two modulators according to the prior art. Referring to FIG. 1, an optical laser 110 applies a continuous wave (CW) laser light to a first Mach Zehnder (MZ) modulator (referred to as a optical modulator) 120. The first optical modulator 120 receives a clock signal of 5 Hz or 10 GHz from a radio frequency (RF) input port to output a pulse string of 10 GHz. If the optical modulator 120 receives the clock signal of 5 GHz from the RF input port, the first optical modulator 120 receives an RF signal having an amplitude doubling Vpi (a peak of input voltage) of the first optical modulator 120 to generate a pulse string of 10 GHz. If the first optical modulator 120 receives the clock of 10 GHz, the first optical modulator 120 receives an RF signal having an amplitude equal to Vpi to generate a pulse string of 10 GHz. However, a pulse width of the pulse string depends on a transfer function of the first optical modulator 120. Thus, it is difficult to obtain a pulse string having pulses having a small pulse width. Accordingly, if the pulse string is modulated into data, cross talk is highly likely to occur between neighboring bits. Thus, a probability of an error occurring is increased.

SUMMARY OF THE INVENTION

The present invention provides an apparatus and a method for directly modulating two lasers, compressing and mixing pulse strings of the two lasers, obtaining a pulse string having pulses of a small pulse width, and modulating the pulse string into data so as to generate a return-to-zero (RZ) signal.

According to an aspect of the present invention, there is provided an apparatus for generating a return-to-zero (RZ) signal, including: a first modulator receiving a first signal having a predetermined frequency to modulate, compensate for, and output a first laser beam; a second modulator receiving a second signal complementary to the first signal to modulate, compensate for, and output a second laser beam; a mixer mixing signals output from the first and second modulators to output a third signal; and a third modulator modulating the third signal into an RZ signal and outputting the RZ signal.

According to another aspect of the present invention, there is provided a method of generating an RZ signal in an optical transmitter, including: receiving a first signal having a predetermined frequency to directly modulate and compress a first laser beam so as to generate a first pulse; receiving a second signal complementary to the first signal to directly modulate and compress a second laser beam so as to generate a second pulse; mixing the first and second pulses to output a third signal having a frequency doubling a frequency of one of the first and second signals; and modulating the third signal into an RZ signal.

The first modulator may include: a first light source directly modulating the first laser beam based on the first signal into a first pulse string and outputting the first pulse string; and a first compensator receiving, compressing, and outputting the first pulse string.

The second modulator may include: a second light source directly modulating the second laser beam based on the second signal that is 180° out of phase with the first signal to output a second pulse string; and a second compensator receiving, compressing, and outputting the second pulse string.

The first and second laser beams may have an identical wavelength.

The first and second modulators may compress the first and second pulse strings using an element which compensates for dispersion and can be reconstituted.

The element may be constituted by one of a dispersion compensated fiber (DCF), a dispersion decreased fiber (DDF), and a chirp grating.

The first and second signals may be clock signals which are simultaneously generated by a clock source.

The third signal may have a frequency double a frequency of one of the first and second signals.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram illustrating a direct modulation and signal pulse strings having compressed pulses; and FIG. 5 is a flowchart illustrating a method of generating an RZ signal of 10 Gbps according to the present invention.

DETAILED DESCRIPTION OF THE INVENTION

An apparatus and a method for generating a return-to-zero (RZ) signal according to the present invention are characterized in that lasers are directly modulated to obtain, compress, and mix pulse strings so as to generate a pulse string having a small pulse width, and the generated pulse string is modulated using an optical modulator to obtain an RZ signal.

Hereinafter, the present invention will be described in detail by explaining preferred embodiments of the invention with reference to the attached drawings.

Figure 1:
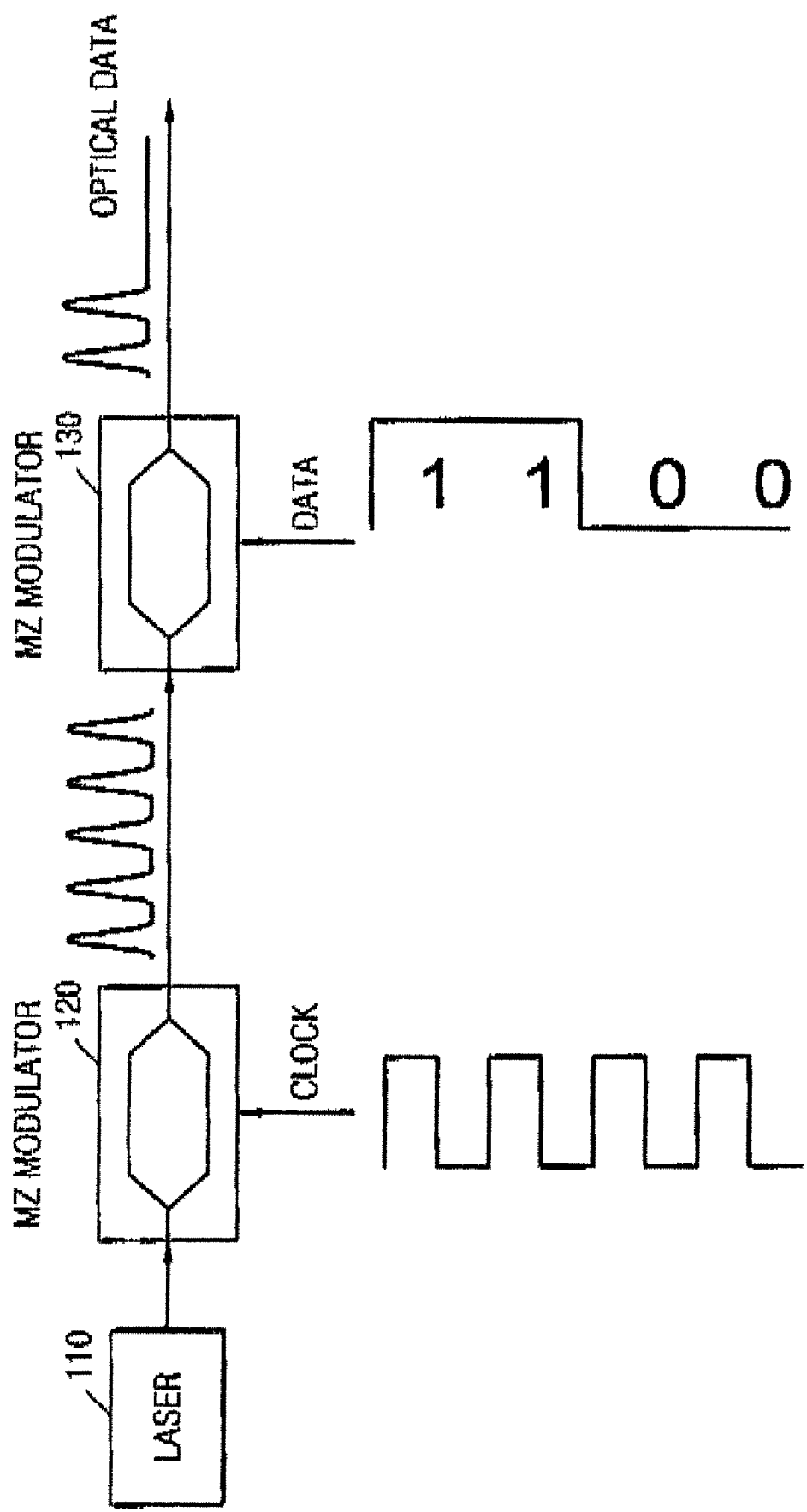
FIG. 1 is a diagram illustrating a general method of generating a return-to-zero (RZ) signal.
Figure 2A:
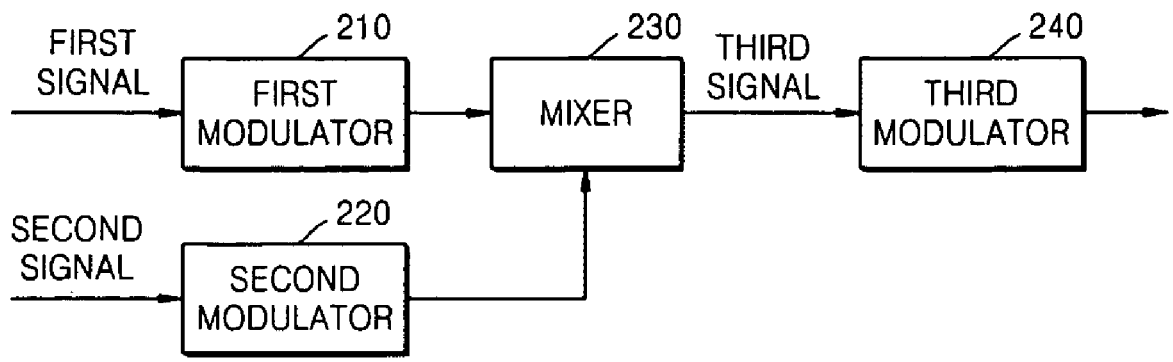
FIG. 2A is a block diagram illustrating a configuration of an apparatus for generating an RZ signal according to the present invention.
Figure 2B:
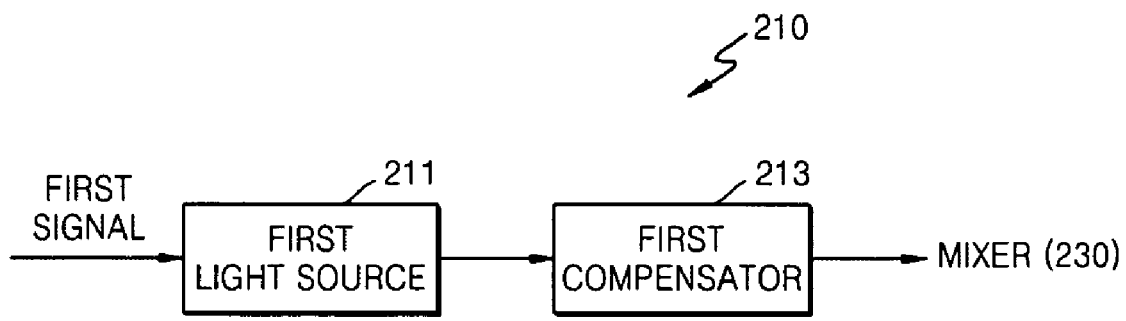
FIG. 2B is a block diagram illustrating a detailed configuration of a first modulator illustrated in FIG. 2A.
Figure 2C:
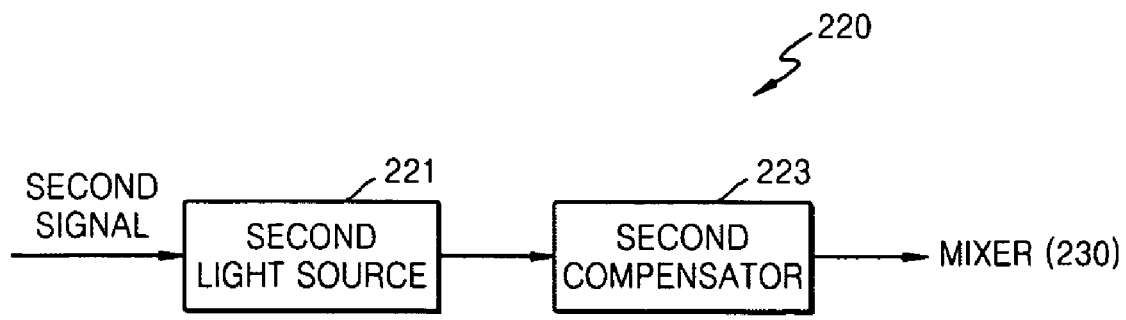
FIG. 2C is a block diagram illustrating a detailed configuration of a second modulator illustrated in FIG. 1.
Figure 3:
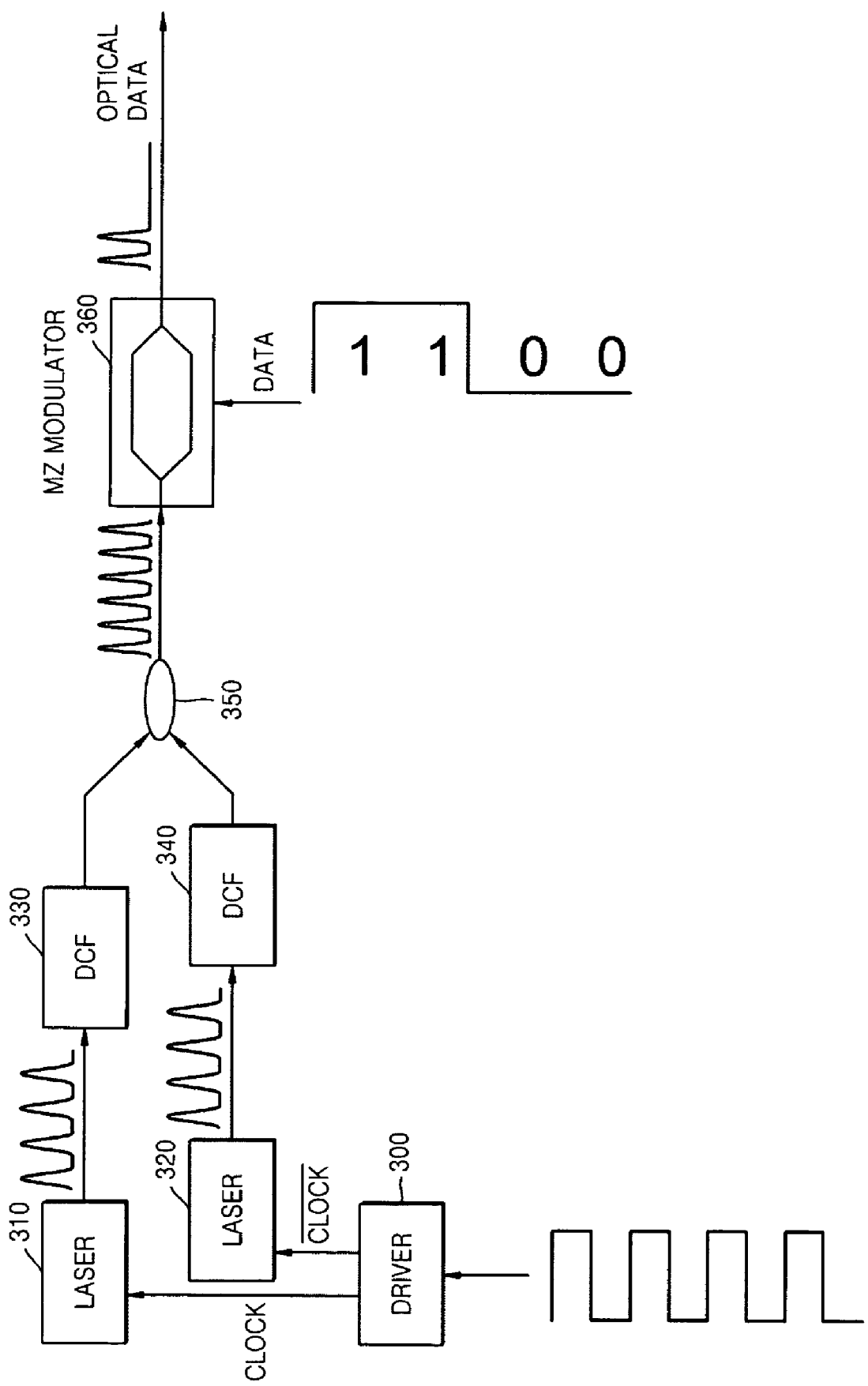
FIG. 3 is a diagram illustrating a method of modulating an output pulse string and data of an RZ signal.

FIG. 2A is a block diagram illustrating a configuration of an apparatus for generating an RZ signal according to the present invention, FIG. 2B is a block diagram illustrating a detailed configuration of a first modulator illustrated in FIG. 2A, and FIG. 2C is a block diagram illustrating a detailed configuration of a second modulator illustrated in FIG. 2A. FIG. 3 is a diagram illustrating a method of modulating an output pulse string and data of an RZ signal, FIG. 4 is a diagram illustrating a direct modulation and signal pulse strings having compressed pulses, and FIG. 5 is a flowchart illustrating a method of generating an RZ signal of 10 Gbps according to the present invention.

An apparatus and a method for generating an RZ signal according to the present invention will now be described with reference to FIGS. 2A through 2C and 5.

A first modulator 210 receives a first signal having a frequency of 5 GHz to modulate, compensates for, and outputs a first laser beam. The first modulator 210 includes a first light source 211 and a first compensator 213. The first light source 211 receives the first signal to directly modulate the first laser beam into a first pulse string and outputs the first pulse string. The first compensator 213 compresses and outputs the first pulse string in operation S510.

A second modulator 220 performs the same function as the first modulator 210. However, the second modulator 220 is different from the first modulator 210 in that a second signal is complementary to the first signal.

The second modulator 220 receives the second signal complementary to the first signal to modulate, compensates for, and outputs a second laser beam. The second modulator 220 includes a second light source 221 and a second compensator 223. The second light source 221 directly modulates the second laser beam based on the second signal that is 180° out of phase with the first signal to output a second pulse string. A second compensator 223 receives, compresses, and outputs the second pulse string in operation S520.

The first and second light sources 211 and 221 may be lasers having the same wavelength. The first and second modulators 210 and 220 may perform the compensation and compression of the pulse strings using an element which can compensate for dispersion and be reconstituted, e.g., an element based on a dispersion compensated fiber (DCF), a dispersion decreased fiber (DDF), or a chirp grating. Also, the first and second signals are clock signals that are simultaneously generated by a clock source.

A mixer 230 mixes signals output from the first and second modulators 210 and 220 to output a third signal having a frequency double the frequency of the first or second signal in operation S530. A third modulator 240 receives the third signal, modulates the third signal into an RZ signal, and outputs the RZ signal in operation S540.

The apparatus and method for generating an RZ signal according to the present invention will now be described in more detail with reference to FIGS. 3 and 4. FIG. 3 is a diagram illustrating a method of modulating an output pulse string of an RZ signal and encoding data onto the RZ signal, and FIG. 4 is a view illustrating a direct modulation and signal pulse strings having compressed pulses.

As shown in FIG. 3, two lasers 310 and 320 are used in the present invention. A 5 GHz clock signal is applied to the laser 310 and a 5 GHz inverted clock signal is applied to the laser 320 to directly modulate the two lasers. The 5 GHz clock signal and the 5 GHz inverted clock signal are out of phase from each other by 180°. Thus, a medium is not required to delay the phases of the 5 GHz clock signal and the 5 GHz inverted clock signal when the 5 GHz clock signal and the 5 GHz inverted clock signal are mixed by a mixer. A driver 300 receives a clock to generate a clock signal and an inverted clock signal. The driver may generate two clock signals so that the two clock signals have the same magnitude and are 180° out of phase with each other. A pulse string formed in such a way has pulses having a pulse width less than 30 ps. A pulse string having pulses with such a pulse width less than 30 ps is highly likely to cause cross talk between bits as described above. Also, a pulse string obtained through a direct modulation has a pulse frequency of 5 GHz. Thus, when two pulse strings are mixed by a mixer 350 to generate a pulse string having a pulse frequency of 10 GHz, pulses of the pulse string having a large pulse width may affect neighboring pulses. Thus, the pulse string having the large pulse width is compensated for by DCFs 330 and 340 and then compressed to have an appropriate pulse width. The compressed pulse string is modulated into data (in the example shown in FIG. 3 the data is "1100") using an optical modulator 360 to obtain an RZ signal. The direct modulation and the compression and mixture of optical pulses will now be described in detail with reference to FIG. 4.

FIG. 4 is a diagram illustrating a process of changing optical pulse strings when directly modulated pulses are generated, compressed, and mixed. Line graphs 410 and 420 indicate transfer functions of optical outputs with respect to currents of lasers. The direct modulation indicates that a clock signal such as an RF clock signal is applied to a laser to obtain first and second pulse strings 430 and 450. A phase difference between the first and second optical pulses 430 and 450 is 180°. Two clock signals having a phase difference of 180° are applied to the two lasers to directly modulate the lasers so as to obtain the phase difference of 180°. A pulse string obtained by mixing pulse strings which are formed by applying clock signals having no phase difference to two lasers overlap entirely with each other due to having no phase difference when mixed. Thus, a 180° phase difference is required between the two pulse strings which are to be mixed. However, because a 180° phase difference is created during a direct modulation, a function for creating an additional phase delay is not required. The two lasers must have the same wavelength so the wavelength of a resultant mixture of the two lasers is the same. If two lasers having different wavelengths are directly modulated, two different wavelengths exist when the two lasers are mixed by a mixer. Thus, in the present invention adopting a direct modulation, lasers having the same wavelength are used. The pulse strings 430 and 450 that are directly modulated have chirps. Such chirps may cause dispersion during transmission so that pulse widths of pulses of pulse strings disperse. However, the chirps may be used to compress pulses through a fiber having a dispersion compensation function. The dispersion compensation function may be performed by a dispersion compensator using a DCF, a DDF, or a chirp grating as previously described. Pulse strings 440 and 460 obtained by the dispersion compensator are compressed to pulse strings having a pulse width less than 10 ps and then mixed by the mixer 350. A pulse frequency of each of the pulse strings 440 and 460 is 5 GHz before the pulse strings 440 and 460 are mixed. However, a pulse frequency of a combination of the pulse strings 440 and 460 is 10 GHz after the pulse strings 440 and 460 are mixed. As a result, a combined signal, a pulse string 470, is generated. If the pulse string 470 is modulated into data by the optical modulator 360, the pulse string becomes an RZ signal.

In other words, if data of "1100" is applied to an optical modulator and a data bit to be modulated is "1," a pulse is output. If a data bit to be modulated is "0," a pulse is not output. Thus, the optical modulator outputs an Rz signal of "1100."

As described above, in an apparatus and a method for generating an RZ signal according to the present invention, lasers can be directly modulated to obtain a 10 Gbps RZ signal. Thus, the apparatus can be constituted at a lower cost than in a conventional method of generating an RZ signal using two optical modulators.

Also, the apparatus can be more simply constituted than a conventional optical transmitter generating an RZ signal.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for generating a return-to-zero (RZ) signal, comprising:
    a first modulator receiving a first signal to generate a first optical signal of a first pulse string, and compensate for a dispersion characteristic of the first optical signal;
    a second modulator receiving a second signal complementary to the first signal to generate a second optical signal of a second pulse string, and compensate for a dispersion characteristic of the second optical signal;
    a mixer mixing the dispersion-compensated first and second optical signals to output a third optical signal; and
    a third modulator receiving a third signal to modulate the third optical signal into an RZ signal.

2. The apparatus of claim 1, wherein the first modulator comprises:
    a first light source directly modulating the first laser beam based on the first signal into the first optical signal of the first pulse string; and
    a first compensator reducing pulse widths of the first pulse string.

3. The apparatus of claim 1, wherein the second modulator comprises:
    a second light source directly modulating the second laser beam based on the second signal into the second optical signal of the second pulse string; and
    a second compensator reducing pulse widths of the second pulse string.

4. The apparatus of claim 1, wherein the first and second optical signal have an identical wavelength.

5. The apparatus of claim 1, wherein the dispersion of the first and second optical signals are compensated by one of a dispersion compensated fiber (DCF), a dispersion decreased fiber (DDF), and a chirp grating.

6. The apparatus of claim 1, wherein the first and second signals are clock signals which are simultaneously generated by a clock source.

7. The apparatus of claim 1, wherein the third signal has a frequency double a frequency of the first and second signals.

8. A method of generating an RZ signal in an optical transmitter, comprising:
    receiving a first signal to generate a first optical signal and to compensate for a dispersion characteristic of the first optical signal;
    receiving a second signal complementary to the first signal to generate a second optical signal and to compensate for a dispersion characteristic of the second signal;
    mixing the first and second optical signals to generate a third optical signal having a frequency double a frequency of the first and second optical signals; and
    modulating the third optical signal into an RZ signal.

9. The method of claim 8, wherein the first and second optical signals have an identical wavelength.

10. The method of claim 8, wherein the second signal is generated so as to have a phase difference of 180° from the first signal.

11. A computer-readable recording medium having embodied thereon a computer program for the method of claim 8.

* * * * *